United States Patent Office 3,231,627
Patented Jan. 25, 1966

3,231,627
PROCESS FOR PREPARING CYCLODODECA-TRIENES AND CATALYST THEREFOR
Grover C. Royston, Baker, La., assignor to Copolymer Rubber & Chemical Corporation, a corporation of Louisiana
No Drawing. Filed Feb. 23, 1962, Ser. No. 175,269
31 Claims. (Cl. 260—666)

This invention broadly relates to the preparation of cyclopolyolefins from acyclic conjugated diolefins and, more specifically, to a process for preparing cyclododecatrienes. The invention further relates to a novel catalyst and a process for its preparation, and to the novel compound cis,cis,trans-1,5,9-cyclododecatriene and a process for its preparation.

It is known that 1,3-butadiene may be reacted over organo-metallic catalysts such as $TiCl_4$—$Et_2AlCl$ and $CrO_2Cl_2$—$AlEt_3$ to produce a reaction mixture containing cis,trans,trans- or trans,trans,trans-1,5,9-cyclodoecatriene. However, the reaction mixture also contains large amounts of lower and higher oligomers, polymer and unidentified high boiling materials which lower yields unnecessarily and complicate product recovery and purification since the mixture is very difficult to separate. Thus it is apparent that it would be desirable to provide a process for the preparation of cis,trans,trans- and/or trans,-trans,trans-1,5,9-cyclododecatriene in high yield and without the formation of a reaction mixture containing substantial amounts of polymer and unidentified high boiling materials. The resultant reaction mixture would be readily processable without elaborate purification schemes and the attendant expense.

It has been found that a catalyst prepared from chromium acetylacetonate and triethyl aluminum catalyzes the homopolymerization of 1,3-butadiene to produce a polymer having a 1,2-structure, and that a catalyst prepared from chromium acetylacetonate and diethylaluminum chloride is inactive in the homopolymerization of 1,3-butadiene. Therefore, neither of these catalysts is capable of producing a cyclic trimer of 1,3-butadiene such as 1,5,9-cyclododecatriene.

The surprising discovery has been made that a novel three component catalyst prepared, for example, from critical quantities of chromium acetylacetonate, diethylaluminum chloride and triethyl aluminum is a highly active catalyst for preparing cyclic trimers from acyclic conjugated diolefins such as 1,3-butadiene. The novel catalyst is especially desirable since 1,5,9-cyclododecatrienes may be produced in high yield with none or substantially reduced amounts of undesirable substances such as polymers and high boiling materials thereby allowing the reaction mixture to be readily separated by simple procedures. It has been further discovered that the novel catalyst is capable of catalyzing the reaction of 1,3-butadiene to produce the new compound cis,cis,trans-1,5,9-cyclododecatriene.

It is an object of the invention to provide a novel catalyst which is especially useful for preparing cyclododecatrienes from acyclic conjugated diolefins and a process for its preparation.

It is a further object to provide an improved process for trimerizing acyclic conjugated diolefins to produce cyclododecatrienes which utilizes the novel catalyst of the invention.

It is still a further object to provide the novel stereoisomer cis,cis,trans-1,5,9-cyclododecatriene and a process for its preparation.

Still other objects and advantages will be apparent to those skilled in the art upon reference to the following detailed description and the examples.

In accordance with one important variant of the present invention, acyclic conjugated diolefins may be reacted in the presence of the novel catalyst to be described hereinafter to produce cyclic trimers in high yield. A wide variety of cyclic trimers may be prepared depending upon the specific acyclic conjugated diolefin which is selected as the starting material. One class of acyclic conjugated diolefins are those of the general formula:

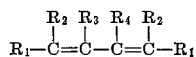

wherein $R_1$, $R_2$, $R_3$ and $R_4$ are hydrogen or organic substituents such as alkyl, cycloalkyl, aryl, alkyl substituted cycloalkyl and aryl radicals. The organic substituents may contain 1–20 carbon atoms, but 1–8 or 1–4 carbon atoms are preferred in most instances. Conjugated diolefins such as 1,3-butadiene, isoprene, 2,3-dimethylbutadiene, and piperylene are usually preferred. The resultant cyclic trimers are 1,5,9-cyclododecatriene when 1,3-butadiene is trimerized and substituted cyclododecatrienes when other conjugated diolefins are trimerized.

The novel catalyst may be prepared in solution in an organic solvent from a soluble chromium-containing compound and an organoaluminum halide material having the formula composition $R_xAlX_y$, wherein R is a monovalent organic radical or a mixture thereof with hydrogen, X is halogen, $x+y$ are 3 and the ratio of $x$ to $y$ is between 2.1:0.9 and 2.9:0.1 and preferably between 2.6:0.4 and 2.7:0.3. A wide variety of chromium-containing compounds are known which are soluble in the organic solvent selected for preparing the catalyst and/or carrying out the reaction to trimerize the conjugated diolefin. Examples include soluble organic chromium compounds such as the organic complexes of chromium, and especially the beta-diketone complexes of chromium including complexes of 2,4-pentanedione. An acetylacetonate complex of chromium such as chromium (III) triacetylacetonate is usually preferred but other suitable soluble chromium-containing compounds may be used.

The organoaluminum halide material for the catalyst may be provided from various sources such as, for example, $AlX_3$—$AlR_3$, $RAlX_2$—$AlR_3$, $R_2AlX$—$AlR_3$, $AlX_3$—$AlH_3$ and combinations thereof in quantities to arrive at the composition $R_xAlX_y$, in which the ratio of $x$ to $y$ is between 2.1:0.9 and 2.9:0.1 and preferably between 2.6:0.4 and 2.7:0.3. The $x$ to $y$ ratio must lie within the foregoing ranges since catalysts prepared from triorgano aluminum or diorganoaluminum halide have been found to be inactive or to produce a polymer having a 1,2-structure. The monovalent organic radical R may be for example alkyl, cycloalkyl, aryl, alkyl substituted cycloalkyl and aryl radicals and mixtures thereof with hydrogen. Preferably, the organo substituents are saturated, with the exception of aromatic unsaturation, and contain 1–20 carbon atoms and for best results 1–8 or 1–4 carbon atoms. Specific examples include alkyl radicals such as methyl, ethyl, propyl, isopropyl, butyl, isobutyl, etc. Usually chlorine and bromine are preferred halogens and chlorine may give better results in most instances.

The gram atomic weight ratio of aluminum to chromium in the catalyst may vary, for example, between about 4:1 and about 30:1, with very useful ranges being between about 8:1 and 20:1. However, much wider ranges may be employed in some instances and the above is not limiting as any suitable catalytically active ratio may be employed. Better results are usually obtained when the gram atomic weight ratio of aluminum to chromium is between 10:1 and 16:1, and best results when the ratio is about 12:1. The ratio of gram mols of butadiene to be reacted to gram atomic weights of chromium in the catalyst may vary over wide ranges such as, for example, between about 400:1 and about 2500:1, and and preferably between about 800:1 and about 1000:1. Higher or lower ratios often may be employed with good results.

In general, the catalyst may be prepared by reacting the organoaluminum halide compound or compounds and the chromium-containing compound and preferably in solution in an organic solvent. The solvent may comprise an aromatic hydrocarbon although in some instances mixed aromatic-aliphatic hydrocarbon solvents or inert organic solvents other than hydrocarbons may be employed. When following one specific procedure, a chromium compound such as chromium (III) acetylacetonate may be introduced as a 0.2 to 0.5 molar benzene solution into a reaction vessel. Thereafter, diethylaluminum chloride may be added as a 1.0 molar benzene solution, and the chromium (III) acetylacetonate passes through a green color to a clear brown within about 15 to 20 seconds. After standing for about 1 minute, the mixture is a turbid light brown color and within five minutes a whitish precipitate separates. At this stage, it is desirable that the resultant product be aged a few minutes such as from 5 minutes to 1 hour or longer, and preferably about 15 minutes, at temperatures varying from about normal room temperature up to 50° C. or higher. After the chromium acetylacetonate and diethylaluminum chloride have reacted, triethyl aluminum may be introduced as a 1.0 molar benzene solution and the mixture again aged as noted above. The addition of the triethyl aluminum produces no visible change in the reaction mixture. Thereafter, the catalyst mixture may be treated with 100 cc. of benzene as a solvent followed by adding the conjugated diolefin which is to be reacted to produce a cyclic trimer. In a simplified procedure, the catalyst may be prepared by first adding the two aluminum compounds to the benzene solution, and then adding the chromium acetylacetonate. The resultant dilute catalyst mixture is then aged for time periods as noted above.

The trimerization reaction preferably is carried out in an aromatic solvent such as benzene or toluene, or mixtures of an aromatic solvent and an aliphatic solvent. The concentration of the butadiene in the solution may vary over wide ranges such as, for example, from about 5 to 50% by weight. The pressure may be sufficient to maintain liquid phase conditions and in most instances a low positive pressure such as up to 100 p.s.i. is preferred.

The reaction temperature may be between about 0° C. and about 100° C. but lower or higher temperatures may be used if desired. Usually a reaction temperature between about 20° C. and 50° C. is preferred. The reaction time may vary somewhat depending upon the temperature and other reaction conditions. Satisfactory reaction periods may vary from a few minutes up to 24 hours or longer, with reaction periods of about 1-3 hours usually being sufficient under preferred reaction conditions. It is understood that the reaction temperature and time may vary widely to produce desired results. For instance, at higher reaction temperatures usually shorter reaction periods are desirable and at lower reaction temperatures longer periods of reaction.

The reaction mixtures produced in accordance with the present invention may be separated by steam distillation to produce an oil fraction which then may be vacuum distilled to produce the product. The novel compound cis,cis,-trans-1,5,9-cyclododecatriene has a number of important uses. For instance, the compound may be oxidized with nitric acid to produce succinic acid, or partially hydrogenated to the monoolefin and then oxidized to produce 1,12-dodecanedioic acid. Such diacids are widely used in preparing plasticizers, synthetic lubricants, polyesters, etc.

The foregoing detailed description and the following specific examples are for purposes of illustration only, and are not intended as being limiting to the spirit or scope of the appended claims.

EXAMPLE I

To a dry 7-ounce beverage bottle which had been thoroughly flushed with dry nitrogen for 1 minute was added 100 ml. of dry benzene. The dry nitrogen flush was continued for an additional 4 minutes and the bottle was capped with a neoprene self-sealing liner and a crown cap punched so as to permit syringe addition of catalyst and monomer.

A chromium (III) acetylacetonate solution in benzene (containing 2.5 mM. of chromium) was introduced into the bottle followed by 10.2 mM. of triethyl aluminum, which was added as a 3.51 molar solution in benzene. A dark brown precipitate formed following this addition. After allowing the catalyst mixture to react for 15 minutes at room temperature with mild agitation, 27.3 grams of liquid butadiene (at −75° C.) was introduced by syringe.

The polymerization mixture was reacted at 50° C. for 3½ hours. The characteristic odor of 1,5,9-cyclododecatriene could not be detected in the reaction mixture and only the odor of unreacted butadiene was observed. The product was recovered by addition of an excess of pure methanol, washing the precipitated polymer twice with 5% hydrochloric acid in methanol and twice with water, and then the polymer was dried under vacuum at 55° C. The yield of polymer was 21.7 g. and infrared examination showed the following structure: 68% 1,2-addition; 18% trans-1,4; and 14% cis-1,4.

It is apparent from the above that a catalyst prepared from chromium (III) acetylacetonate and triethyl aluminum alone is inactive in the trimerization of butadiene.

When the above procedure was repeated with the exception of substituting diethylaluminum chloride for the triethyl aluminum, no reaction occurred. Thus, the reaction product of chromium (III) acetylacetonate and diethylaluminum chloride is inactive as a polymerization catalyst for 1,3-butadiene.

The term "mM." is used in this and subsequent examples to refer to millimoles.

EXAMPLE II

The general procedure of Example I was repeated with the exception of using as catalyst components chromium (III) acetylacetonate ($CrA_3$) and diethylaluminum chloride, 100 cc. of benzene as a polymerization solvent and a reaction temperature of 50° C. Other variables appear in the table below. The results obtained are recorded in the following table:

Table I

| $CrA_3$ (mM.) | $Et_2AlCl$ (mM.) | BD (g.) | Reaction time, hrs. |
|---|---|---|---|
| 1.5 | 7.5 | 26.9 | 20 |
| 2.5 | 20.0 | 26.6 | 24 |
| 2.5 | 29.8 | 26.7 | 24 |

Neither polymer nor an oligomer of butadiene, including a 1,5,9-cyclododecatriene, was recovered from any of the above three experiments. The term "BD" in this and subsequent examples refers to 1,3-butadiene.

EXAMPLE III

To a dry 7-ounce beverage bottle flushed for 5 minutes with dry nitrogen and capped as in Example I was added 1.52 cc. of a 0.5 molar benzene solution of chromium (III) acetylacetonate, and 2.0 mM. of diethylaluminum chloride as a 1.0 molar solution in benzene. The above components were allowed to age for about 5 minutes at normal room temperature, and then 4.0 mM. of triethyl aluminum as a 1.0 molar benzene solution was added. The resultant three component mixture was allowed to age for 15 minutes at normal room temperature, and then 100 ml. of dry benzene was added. Liquid 1,3-butadiene (33.4 grams) was injected by syringe and the mixture was reacted in a water bath heated to 50° C.

After 2½ hours, the reaction mixture was removed from the water bath and treated with 0.5 cc. of pure methanol. Analysis of the reaction mixture by gas chromatography showed that 22.8 grams or 93% of the butadiene reacting had been converted to 1,5,9-cyclododecatriene.

The reaction mixture was treated with an excess of methanol but no polybutadiene precipitated. Steam distillation of the reaction mixture gave only 1.8 grams of an oily product, and the remainder was the desired 1,5,9-cyclododecatriene.

minum, followed by aluminum chloride, and finally chromium (III) acetylacetonate in the relative amounts given in the table appearing below. The catalyst components were aged for about 15 minutes at normal room temperature and 0.625 mol of liquid butadiene was introduced to each of the catalyst mixtures by means of a hypodermic syringe. Reaction was for a period of 2½ hours at 50° C.

The data in Table II illustrates the effect of varying $x:y$ in the $R_xAlCl_y$ portion of the catalyst at a constant butadiene/chromium/aluminum ratio.

Table II

| Al(iBu)₃ (mM.) | AlCl₃ (mM.) | x:y | CrA₃ (mM.) | Percent yield | 1,5,9-cyclododecatriene | | |
|---|---|---|---|---|---|---|---|
| | | | | | Percent all trans | Percent cis-trans-trans | Percent cis-cis-trans |
| 6.1 | 3.0 | 2.01:0.99 | 0.75 | 13.6 | 59.2 | 34.7 | 6.1 |
| 7.3 | 2.2 | 2.31:0.69 | 0.75 | 14.0 | 52.1 | 39.6 | 8.3 |
| 8.1 | 1.0 | 2.67:0.33 | 0.75 | 62.5 | 52.6 | 41.3 | 6.1 |
| 8.3 | 0.8 | 2.73:0.27 | 0.75 | 43.1 | 50.0 | 44.0 | 6.0 |
| 8.5 | 0.7 | 2.77:0.23 | 0.75 | 41.1 | 49.7 | 44.5 | 5.8 |
| 8.7 | 0.4 | 2.87:0.13 | 0.75 | 16.3 | 52.6 | 42.1 | 5.3 |

EXAMPLE IV

In this example, the catalyst was prepared in a dilute benzene solution using tri-isobutyl aluminum, chromium (III) acetylacetonate and diethylaluminum chloride as the catalyst components for the purpose of illustrating the use of an aluminum component having two different alkyl groups.

A glass reaction vessel having a capacity of two quarts was fitted with a port containing a self-sealing neoprene liner to allow syringe addition of catalyst components. Thereafter, the vessel was thoroughly purged with dry oxygen-free nitrogen and 1,000 cc. of pure anhydrous benzene was introduced through a funnel containing calcium sulfate (Drierite) and silica gel as a desiccant.

Tri-isobutyl aluminum (60 mM. in normal heptane) and diethylaluminum chloride (30 mM. in benzene) was added by means of a hypodermic syringe. Chromium (III) acetylacetonate (7.5 mM.) was added as a 0.5 molar solution in benzene. The reaction mixture turned a dark brown, and after stirring 30 minutes at ambient temperature (27° C.), the mixture was heated to 50° C. and addition of pure butadiene was commenced. The rate of monomer addition was so regulated that 2 hours were required for the addition of 359 grams. Reaction was allowed to continue for 1 hour after all the butadiene had been introduced.

At the end of this time, the reaction mixture was as fluid as pure benzene and it was withdrawn from the reactor and treated with acetone to destroy the catalyst. The clear green solution containing the reaction product was steam distilled to remove all catalyst residue. The steam distillate was dried over calcium chloride and distilled at 63–65° C. at a pressure of 1.6 mm. of mercury to give 217 grams of 1,5,9-cyclododecatriene which analyzed as 66% of the trans,trans,trans-isomer, 29% of the cis-trans-trans-isomer, and 28.6 grams of higher oligomers. About 5% of a third component was also present and infrared analysis showed it to be the cis,cis,trans-isomer of 1,5,9-cyclododecatriene. A small amount of polymer (1 gram) was recovered from the reaction mixture.

EXAMPLE V

The general procedure of Example I was followed except as noted using a catalyst prepared in dilute solution from tri-isobutyl aluminum, aluminum chloride (AlCl₃), and chromium (III) acetylacetonate.

To 100 ml. of dry benzene was added tri-isobutyl alu-

EXAMPLE VI

This example demonstrates the use of n-hexane as a solvent.

To a dry 7-oz. beverage bottle which had been thoroughly flushed with dry N₂ was added 100 cc. of n-hexane. N₂ was bubbled through the solvent for about 5 minutes and the bottle was fitted with a self-sealing neoprene liner and capped with a crown cap which had been punctured so as to allow addition of the remaining components by hypodermic syringe.

Et₂AlCl (4.5 mM. as a 1.0 M benzene solution) and 1.13 mM. Cr (III) acetylacetonate were introduced and the mixture was "aged" for 15 minutes at normal room temperature and 8.8 mM. of AlEt₃ (as a 1.22 M benzene solution) was introduced. After about 5 minutes, 33.2 g. of pure butadiene was introduced as a liquid at —75° C. and the sample was reacted for 3 hours at 50° C.

Gas chromatography indicated that 16.8 g. (50.6%) of the butadiene was converted to 1,5,9-cyclododecatriene having the following isomer distribution:

51.3% trans-trans-trans-isomer
43.0% cis-trans-trans-isomer
5.7% cis-cis-trans-isomer

EXAMPLE VII

This example illustrates the oligomerization of isoprene.

The procedure of Example VI was followed with the exception of using polymerization grade isoprene which had been rapidly distilled from CaH₂ immediately prior to use.

To the beverage bottle was charged 100 cc. of dry benzene, 3.0 mM. of Et₂AlCl and 0.75 mM. of Cr (III) acetylacetonate. Following an "aging" time of 5 minutes at normal room temperature, 6.0 mM. of AlEt₃ was added. After an additional 5 minutes "aging" period 34.2 g. of isoprene was introduced and the bottle was tumbled end over end in a 50° C. water bath for 15 hours.

At the end of the reaction period, the sample was washed with 10% aqueous HCl, water washed and dried and distilled to give (in addition to benzene containing unreacted monomer): 12 g. of trimethyl-1,5,9-cyclododecatriene isomers ($n_D^{27}$ 1.5074) B.P. 112–116° C. at 3 mm. Hg and an oily residue ($n_D^{27}$ 1.5124) weighing 13 g.

EXAMPLE VIII

The procedure of Example VII was followed with the exception of using varying amounts of AlEt₃ and Et₂AlCl.

The isoprene charge was 34 g. and the Cr (III) acetylacetonate charge was 0.75 mM.

| Exp. No. | Et²AlCl, mM. | AlEt³, mM. | Time, hours | Temp., ° C. |
|---|---|---|---|---|
| 1 | 2.0 | 7.0 | 15 | 50 |
| 2 | 4.0 | 5.0 | 15 | 50 |
| 3 | 5.0 | 4.0 | 15 | 50 |
| 4 | 6.0 | 3.0 | 15 | 50 |

Examination of the reaction mixtures by gas chromatography showed all to contain appreciable quantities of trimethyl-1,5,9-cyclododecatriene, along with minor amounts of lower molecular weight materials.

The above samples were combined and distilled to give:

62.9 g. (46.2%) trimethyl-1,5,9-cyclododecatriene
5.7 g. (4.2%) low boiling oligomers
56.4 g. (41.4%) higher oligomers Based on the weight of products recovered, 85.5% of the isoprene charge was converted to oligomers. No high polymer was recovered.

The high boiling oligomers produced were passed through a molecular still at 170–180° at 7 to 10 microns Hg to give a clear pale yellow viscous liquid having a $n_D^{27}$ of 1.5122. These materials may have use as extender oils for synthetic rubber or as starting materials for certain organic preparations.

EXAMPLE IX

This example illustrates the separation and identification of cis,cis,trans-1,5,9-cyclododecatriene.

A sample of 1,5,9-cyclododecatriene prepared in accordance with the procedure of Example IV was separated into its isomers by gas chromatography at 175° C. using a two meter column containing Carbowax 1500 on diatomaceous earth. Carbowax 1500 is said to be a soft, white, waxy, solid polyethylene glycol of the general formula $HOCH_2(CH_2-O-CH_2)_xCH_2OH$.

Three components were observed with elution times of 5.61 minutes, 6.59 minutes, and 7.10 minutes, respectively. The first component was found to be the known isomer trans,trans,trans-1,5,9-cyclododecatriene; the second component was found to be the known isomer cis,trans,trans-1,5,9-cyclododecatriene; and the third component was an isomer of 1,5,9-cyclododecatriene of unknown configuration, but presumed to be the cis,cis,trans-1,5,9-isomer.

A sample of 1,5,9-cyclododecatriene containing about 5% of the unknown third isomer referred to above was fractionated by gas chromatography and three fractions were collected for infrared analysis. The fractions were subsequently reanalyzed by gas chromatography to give the following purities:

| Sample of 1,5,9-cyclododecatriene | Percent trans,trans,trans-isomer | Percent cis,trans,trans-isomer | Percent cis,cis,trans-isomer |
|---|---|---|---|
| First | 100 | | |
| Second | 4.1 | 95.9 | |
| Third | 4.8 | 36.0 | 59.2 |

The infrared spectrum of each of the above three samples was obtained and the trans-absorbing region was integrated and divided by the integrated intensity of the methylene band at the 6.9 micron region. Corrections were made for the purity of the sample. The following ratios of trans-absorbence were obtained:

Isomer of 1,5,9-cyclododecatriene: Trans-absorbence (relative)
Trans,trans,trans- _____ 3.0
Cis,trans,trans- _____ 2.3
Cis,cis,trans- _____ 1.0

The above data show the third isomer to be cis,cis,trans-1,5,9-cyclododecatriene.

What is claimed is:

1. A process for preparing a cyclododecatriene comprising
    reacting an acyclic conjugated diolefin which forms a cyclic trimer in the presence of a catalytic amount of a catalyst,
    the catalyst being prepared by reacting together a catalytically effective amount of at least one catalyst-forming beta-diketone complex of chromium and at least one catalyst-forming organoaluminum halide material having the composition $R_xAlX_y$,
    where R is selected from the group consisting of monovalent organic radicals and mixtures thereof with hydrogen, X is halogen, $x+y$ are 3 and the ratio of $x$ to $y$ varies between 2.1:0.9 and 2.9:0.1.

2. A process for preparing a cyclododecatriene comprising
    reacting an acyclic conjugated diolefin which forms a cyclic trimer in an organic solvent in the presence of a catalytic amount of a catalyst,
    the catalyst being prepared by bringing together in solution in an organic solvent at least one soluble beta-diketone complex of chromium and at least one soluble organoaluminum chloride material having the composition $R_xAlX_y$,
    where R is selected from the group consisting of monovalent organic radicals and mixtures thereof with hydrogen, X is chlorine, $x+y$ are 3 and the ration of $x$ to $y$ varies between 2.1:0.9 and 2.9:0.1,
    the organoaluminum chloride material and the chromium compound being present in quantities to provide a gram atomic weight ratio of aluminum to chromium between about 4:1 and about 30:1.

3. A process for preparing a cyclododecatriene comprising
    reacting an acyclic conjugated diolefin which forms a cyclic trimer in an organic solvent in the presence of a catalytic amount of a catalyst,
    the catalyst being prepared by bringing together in solution in an organic solvent at least one soluble beta-diketone complex of chromium and at least one soluble alkylaluminum chloride material having the composition $R_xAlX_y$,
    where R is an alkyl radical, X is chlorine, $x+y$ are 3 and the ratio of $x$ to $y$ varies between 2.1:0.9 and 2.9:0.1,
    the alkylaluminum chloride material and the organic chromium compound being present in quantities to provide a gram atomic weight ratio of aluminum to chromium between about 4:1 and about 30:1.

4. The process of claim 3 wherein R is an alkyl radical containing 1–8, inclusive, carbon atoms.

5. A process for preparing 1,5,9-cyclododecatriene comprising
    reacting 1,3-butadiene in the presence of a catalytic amount of a catalyst,
    the catalyst being prepared by reacting together a catalytically effective amount of at least one catalyst-forming beta-diketone complex of chromium and at least one catalyst-forming organoaluminum halide material having the composition $R_xAlX_y$,
    where R is selected from the group consisting of monovalent organic radicals and mixtures thereof with hydrogen, X is halogen, $x+y$ are 3 and the ratio of $x$ to $y$ varies between 2.1:0.9 and 2.9:0.1.

6. A process for preparing 1,5,9-cyclododecatriene comprising
    reacting 1,3-butadiene in an organic solvent in the presence of a catalytic amount of a catalyst,
    the catalyst being prepared by bringing together in solution in an organic solvent at least one soluble beta-diketone complex of chromium and at least one soluble organoaluminum chloride material having the composition $R_xAlX_y$,
    where R is selected from the group consisting of monovalent organic radicals and mixtures thereof with hydrogen, X is chlorine, $x+y$ are 3 and the ratio of $x$ to $y$ varies between 2.1:0.9 and 2.9:0.1, the organoaluminum chloride material and the chromium compound being present in quantities to provide a gram atomic weight ratio of aluminum to chromium between about 4:1 and about 30:1.

7. A process for preparing 1,5,9-cyclododecatriene comprising reacting 1,3-butadiene in an organic solvent in the presence of a catalytic amount of a catalyst, the catalyst being prepared by bringing together in solution in an organic solvent at least one soluble beta-diketone complex of chromium and at least one soluble alkylaluminum chloride material having the composition $R_xAlX_y$, where R is an alkyl radical, X is chlorine, $x+y$ are 3 and the ratio of $x$ to $y$ varies between 2.1:0.9 and 2.9:0.1, the alkylaluminum chloride material and the organic chromium compound being present in quantities to provide a gram atomic weight ratio of aluminum to chromium between about 4:1 and about 30:1.

8. The process of claim 7 wherein R is an alkyl radical containing 1–8, inclusive, carbon atoms.

9. The process of claim 7 wherein R is at least one alkyl radical selected from the group consisting of ethyl and isobutyl radicals.

10. The process of claim 7 wherein the chromium compound is chromium (III) acetylacetonate.

11. The process of claim 7 wherein the aluminum to chromium ratio is between about 8:1 and about 20:1.

12. The process of claim 7 wherein the ratio of $x$ to $y$ is between about 2.6:0.4 and about 2.7:0.3.

13. The process of claim 7 wherein R is an alkyl radical containing 1–8, inclusive, carbon atoms, the aluminum to chromium ratio is between about 10:1 and about 16:1, and the ratio of $x$ to $y$ is between about 2.6:0.4 and about 2.7:0.3.

14. The process of claim 9 wherein the chromium compound is chromium (III) acetylacetonate, the alkylaluminum chloride material is dialkylaluminum chloride and trialkyl aluminum, and the catalyst is prepared by bringing together in an anhydrous inert organic solvent chromium (III) the acetylacetonate and dialkylaluminum chloride, aging the resulting mixture for at least five minutes, and then adding the trialkyl aluminum thereto.

15. The process of claim 7 wherein R is at least one alkyl radical selected from the group consisting of ethyl and isobutyl radicals, the chromium compound is chromium (III) acetylacetonate, the ratio of aluminum to chromium is about 12:1, and the ratio of $x$ to $y$ is between about 2.6:0.4 and about 2.7:0.3.

16. The catalytically active product of the reaction of a catalytically effective amount of at least one catalyst-forming beta-diketone complex of chromium and at least one catalyst-forming organoaluminum halide material having the composition $R_xAlX_y$, where R is selected from the group consisting of monovalent organic radicals and mixtures thereof with hydrogen, X is halogen, $x+y$ are 3 and the ratio of $x$ to $y$ varies between 2.1:0.9 and 2.9:0.1.

17. The catalytically active product of the reaction in an organic solvent of at least one soluble beta-diketone complex of chromium and at least one soluble organoaluminum chloride material having the composition $R_xAlX_y$, where R is selected from the group consisting of monovalent organic radicals and mixtures thereof with hydrogen, X is chlorine, $x+y$ are 3 and the ratio of $x$ to $y$ varies between 2.1:0.9 and 2.9:0.1, the organoaluminum chloride material and the chromium compound being present in quantities to provide a gram atomic weight ratio of aluminum to chromium between about 4:1 and about 30:1.

18. The catalytically active product of the reaction in an organic solvent of at least one soluble beta-diketone complex of chromium and at least one soluble alkylaluminum chloride material having the composition $R_xAlX_y$, where R is an alkyl radical, X is chlorine, $x+y$ are 3 and the ratio of $x$ to $y$ varies between 2.1:0.9 and 2.9:0.1, the alkylaluminum chloride material and the organic chromium compound being present in quantities to provide a gram atomic weight ratio of aluminum to chromium between about 4:1 and about 30:1.

19. The product of claim 18 wherein R is an alkyl radical containing 1–8, inclusive, carbon atoms.

20. The product of claim 18 wherein R is at least one alkyl radical selected from the group consisting of ethyl and isobutyl radicals.

21. The product of claim 20 wherein the chromium compound is chromium (III) acetylacetonate, the alkylaluminum chloride material is dialkylaluminum chloride and trialkyl aluminum, and the catalyst is prepared by bringing together in an anhydrous inert organic solvent the chromium (III) acetylacetonate and dialkylaluminum chloride, aging the resulting mixture for at least five minutes, and then adding the trialkyl aluminum thereto.

22. The product of claim 18 wherein the chromium compound is chromium (III) acetylacetonate.

23. The product of claim 18 wherein the aluminum to chromium ratio is between about 8:1 and about 20:1.

24. The product of claim 18 wherein the ratio of $x$ to $y$ is between about 2.6:0.4 and about 2.7:0.3.

25. The product of claim 18 wherein R is an alkyl radical containing 1–8, inclusive, carbon atoms, the aluminum to chromium ratio is between about 10:1 and about 16:1, and the ratio of $x$ to $y$ is between about 2.6:0.4 and about 2.7:0.3.

26. The product of claim 18 wherein R is at least one alkyl radical selected from the group consisting of ethyl and isobutyl radicals, the chromium compound is chromium (III) acetylacetonate, the ratio of aluminum to chromium is about 12:1, and the ratio of $x$ to $y$ is between about 2.6:0.4 and about 2.7:0.3.

27. A process for preparing a cyclododecatriene comprising reacting isoprene in an organic solvent in the presence of a catalytic amount of a catalyst, the catalyst being prepared by bringing together in solution in an organic solvent at least one soluble beta-diketone complex of chromium and at least one soluble organoaluminum chloride material having the composition $R_xAlX_y$, where R is selected from the group consisting of monovalent organic radicals and mixtures thereof with hydrogen, X is chlorine, $x+y$ are 3 and the ratio of $x$ to $y$ varies between 2.1:0.9 and 2.9:0.1, the organoaluminum chloride material and the chromium compound being present in quantities to provide a gram atomic weight ratio of aluminum to chromium between about 4:1 and about 30:1.

28. The process of claim 27 wherein R is an alkyl radical containing 1–8, inclusive, carbon atoms.

29. The process of claim 27 wherein the ratio of $x$ to $y$ is between about 2.6:0.4 and about 2.7:0.3.

30. The process of claim 27 wherein R is at least one alkly radical selected from the group consisting of ethyl and isobutyl radicals, the chromium compound is chromium (III) acetylacetonate, the ratio of aluminum to chromium is between about 8:1 and about 20:1, and the ratio of $x$ to $y$ is between about 2.6:0.4 and about 2.7:0.3.

31. The process of claim 30 wherein the organoaluminum chloride material is dialkylaluminum chloride and trialkyl aluminum, and the catalyst is prepared by bringing together in an anhydrous inert organic solvent the chromium (III) acetylacetonate and dialkylaluminum chloride, aging the resulting mixture for at least five minutes, and then adding the trialkyl aluminum thereto.

References Cited by the Examiner

UNITED STATES PATENTS

| | | | |
|---|---|---|---|
| 2,938,890 | 5/1960 | D'Alelio | 260—683.15 |
| 2,943,063 | 6/1960 | Eby | 252—431 X |
| 2,979,543 | 4/1961 | Wilke et al. | 260—666 |
| 2,993,883 | 7/1961 | Lyons | 252—431 X |
| 3,076,045 | 1/1963 | Schneider | 260—666 |
| 3,157,708 | 11/1964 | Munley | 260—666 |
| 3,167,593 | 1/1965 | Mueller | 260—666 |

FOREIGN PATENTS

| | | |
|---|---|---|
| 1,080,547 | 12/1958 | Germany. |
| 872,348 | 7/1961 | Great Britain. |

DELBERT E. GANTZ, *Primary Examiner.*

ALPHONSO D. SULLIVAN, *Examiner.*